(12) United States Patent
Cho et al.

(10) Patent No.: US 11,740,013 B2
(45) Date of Patent: Aug. 29, 2023

(54) REFRIGERATOR AND CONTROLLING METHOD THEREOF

(71) Applicant: Samsung Electronics Co., Ltd., Suwon-si (KR)

(72) Inventors: Sungho Cho, Suwon-si (KR); Seungwan Kang, Suwon-si (KR); Daesung Ki, Suwon-si (KR); Hyunuk Park, Suwon-si (KR); Chanyoung Park, Suwon-si (KR); Taein Eom, Suwon-si (KR); Seungmi Kang, Suwon-si (KR); Kyungtae Ko, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 64 days.

(21) Appl. No.: 17/322,138

(22) Filed: May 17, 2021

(65) Prior Publication Data

US 2021/0396461 A1 Dec. 23, 2021

(30) Foreign Application Priority Data

Jun. 19, 2020 (KR) .......................... 10-2020-0075089

(51) Int. Cl.
*F25D 23/02* (2006.01)
*F25D 29/00* (2006.01)
(Continued)

(52) U.S. Cl.
CPC ............ *F25D 29/00* (2013.01); *E05F 15/611* (2015.01); *F25D 23/028* (2013.01); *H02P 3/06* (2013.01);
(Continued)

(58) Field of Classification Search
CPC .... F25D 23/028; F25D 29/00; F25D 2700/02; E05F 15/611; H02P 3/06; H02P 8/14
See application file for complete search history.

(56) References Cited

U.S. PATENT DOCUMENTS 10,054,362 B2  8/2018  Chang et al.
10,197,326 B2  2/2019  Son et al.
(Continued)

FOREIGN PATENT DOCUMENTS

CN   105423688 A   3/2016
CN   109723309 A   5/2019
(Continued)

OTHER PUBLICATIONS

International Search Report dated Aug. 25, 2021, issued in International Patent Application No. PCT/KR2021/005130.

*Primary Examiner* — James O Hansen
(74) *Attorney, Agent, or Firm* — Jefferson IP Law, LLP

(57) ABSTRACT

A refrigerator is provided. The refrigerator includes a body including a door, a door opening device including a motor, and configured to open the door through a rotation of the motor, a first sensor configured to sense an opening of the door, a second sensor configured to sense a position of the door, and a processor is included, and the processor is configured to control, based on a user command for the opening of the door being obtained, the motor to rotate at a first speed, control, based on the opening of the door being sensed by the first sensor, the motor to rotate by reducing speed in stages to a second speed which is slower than the first speed, and control, based on a position of the door being sensed in a first position by the second sensor, the motor to open the door to a second position by rotating at the second speed.

8 Claims, 12 Drawing Sheets

(51) Int. Cl.
   *E05F 15/611* (2015.01)
   *H02P 8/14* (2006.01)
   *H02P 3/06* (2006.01)

(52) U.S. Cl.
   CPC ............ *H02P 8/14* (2013.01); *E05Y 2900/31* (2013.01); *F25D 2700/02* (2013.01); *F25D 2700/04* (2013.01)

(56) References Cited

U.S. PATENT DOCUMENTS

| | | | |
|---|---|---|---|
| 10,260,797 | B2 | 4/2019 | Kim et al. |
| 10,301,865 | B2 | 5/2019 | Son et al. |
| 10,591,202 | B2 | 3/2020 | Kim et al. |
| 10,927,587 | B2 | 2/2021 | Lee et al. |
| 11,041,671 | B2 | 6/2021 | Kim et al. |
| 2011/0095670 | A1 | 4/2011 | Cho et al. |
| 2014/0268648 | A1* | 9/2014 | Gomes .................. D06F 39/14 312/405 |
| 2017/0336132 | A1 | 11/2017 | Chang et al. |
| 2018/0128537 | A1 | 5/2018 | Kim et al. |
| 2019/0154327 | A1 | 5/2019 | Kim et al. |
| 2019/0162006 | A1 | 5/2019 | Lee et al. |
| 2019/0162467 | A1 | 5/2019 | Lee et al. |
| 2019/0330909 | A1* | 10/2019 | Lee .................. E05F 15/79 |
| 2020/0173710 | A1 | 6/2020 | Kim et al. |

FOREIGN PATENT DOCUMENTS

| | | |
|---|---|---|
| JP | 2016-011798 A | 1/2016 |
| JP | 2017-526884 A | 9/2017 |
| JP | 6378950 B2 | 8/2018 |
| KR | 10-2001-0092059 A | 10/2001 |
| KR | 10-2001-0092060 A | 10/2001 |
| KR | 20-0337312 Y1 | 12/2003 |
| KR | 10-0740800 B1 | 7/2007 |
| KR | 10-1480459 B1 | 1/2015 |
| KR | 10-1580447 B1 | 12/2015 |
| KR | 10-1618552 B1 | 5/2016 |
| KR | 10-1655801 B1 | 9/2016 |
| KR | 10-2017-0014564 A | 2/2017 |
| KR | 10-2017-0082009 A | 7/2017 |
| KR | 10-2019-0061175 A | 6/2019 |
| KR | 10-2012487 B1 | 8/2019 |
| WO | 2016/200050 A1 | 12/2016 |
| WO | 2018/084656 A1 | 5/2018 |

\* cited by examiner

| t(ms) | calibration rpm |
|---|---|
| t<1150 | 300 |
| 1150<t<1300 | 400 |
| 1300<t<1500 | 500 |
| 1500<t | 600 |

REFRIGERATOR AND CONTROLLING METHOD THEREOF

CROSS-REFERENCE TO RELATED APPLICATION(S)

This application is based on and claims priority under 35 U.S.C. § 119(a) of a Korean patent application number 10-2020-0075089, filed on Jun. 19, 2020, in the Korean Intellectual Property Office, the disclosure of which is incorporated by reference herein in its entirety.

BACKGROUND

1. Field

The disclosure relates to a refrigerator and a controlling method thereof. More particularly, the disclosure relates to a refrigerator which opens a door automatically and a controlling method thereof.

2. Description of Related Art

With the development of electronic technology, recently, there is an increase in user need for refrigerators that automatically opens and closes a refrigerator door. For example, there may be a pressing need for an automatic opening function of the door in a situation where a user is unable to open the door directly due to holding heavy dishes with both hands.

In order to open and close the door automatically as described above, a motor providing power to rotate the door is required. According to the related art, in order to open the door while the door is in a closed state, significant force is required due to a difference in an inside and an outside pressure of the refrigerator compartment, and accordingly, the motor is configured to rotate quickly. On the other hand, after the door is opened by a certain angle or more, there is a need to reduce speed and rotate the motor to prevent collision with the user.

Accordingly, there is a growing need for technology which controls the motor to automatically open the door taking into consideration user safety.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator which appropriately controls a rotational speed of a motor of a refrigerator door opening device thereby increasing user convenience and safety.

Additional aspects will be set forth in part in the description which follows and, in part, will be apparent from the description, or may be learned by practice of the presented embodiments.

In accordance with an aspect of the disclosure, a refrigerator is provided. The refrigerator includes a body including a door, a door opening device including a motor, the door opening device configured to open the door through a rotation of the motor, a first sensor configured to sense an opening of the door, a second sensor configured to sense a position of the door, and a processor, and the processor is configured to control, based on a user command for the opening of the door being obtained, the motor to rotate at a first speed, control, based on an opening of the door being sensed by the first sensor, the motor to rotate by reducing speed in stages to a second speed which is slower than the first speed, and control, based on the position of the door being sensed in a first position by the second sensor, the motor to open the door to a second position by rotating at the second speed.

The refrigerator may further include a motor rotation sensing part configured to sense a rotation of the motor, and the motor rotation sensing part may be configured to output a pulse in a rotation process of the motor, and the processor may be configured to stop the motor based on a pulse not being output from the motor rotation sensing part for a pre-set time.

The processor may be configured to stop the motor based on a pulse not being output from the motor rotation sensing part for a first time, when the door is positioned between a closed position and the first position, and stop the motor based on a pulse not being output from the motor rotation sensing part for a second time which is less than the first time, when the door is positioned between the first position and the second position.

The processor may be configured to identify a rotational speed of the motor while the door is being opened from a closed position to the first position, and control, based on the identified rotational speed of the motor being faster than a threshold speed, the motor to open the door to a second position by rotating at a third speed which is slower than the second speed.

The processor may be configured to identify a rotational speed of the motor based on a first time at which an opening of the door is sensed by the first sensor and a second time at which a position of the door is sensed as in the first position by the second sensor.

The door may include a first door provided in a refrigerator compartment and a second door provide in a freezer compartment positioned at a lower part of the refrigerator compartment, and the door opening device may be provided at an upper end of the first door, and the second sensor may be provided at a lower end of the first door.

The refrigerator may further include a proximity sensor, and the processor may be configured to stop the motor based on sensing an object present within a pre-set distance from the door by the proximity sensor while the motor is in rotation.

The processor may be configured to control, based on a pre-set time passing after the door is opened to the second position, the motor so as to rotate at a fourth speed to close the door, and control, based on a position of the door being sensed in the first position by the second sensor, the motor to cause the door to be fully closed by rotating at a fifth speed which is faster than the fourth speed.

The first position may be a position opened by 30 degrees from the position in which the door is closed, and the second position may be a position opened by 90 degrees from the position in which the door is closed.

In accordance with another aspect of the disclosure, a controlling method of a refrigerator is provided. The controlling method of a refrigerator includes a body including a door and a door opening device including a motor, the door opening device configured to open the door through a rotation of the motor, the method including controlling the motor to rotate at a first speed based on a user command for opening the door being obtained, controlling, based on an opening of the door being sensed by the first sensor, the motor to rotate by reducing speed in stages to a second speed which is slower than the first speed, and controlling, based on a position of the door being sensed in the first position by the second sensor, the motor to open the door to a second position by rotating at the second speed.

The refrigerator further includes a motor rotation sensing part to sense a rotation of the motor, the motor rotation sensing part is configured to output a pulse in a rotation process of the motor, and the controlling method further includes stopping the motor based on a pulse not being output from the motor rotation sensing part for a pre-set time.

The stopping the motor may include stopping, based on the door being positioned between a closed position and the first position, the motor when a pulse is not output from the motor rotation sensing part for a first time, and stopping, based on the door being positioned between the first position and the second position, the motor when a pulse is not output from the motor rotation sensing part for a second time which is less than the first time.

The controlling method may further include identifying a rotational speed of the motor while the door is being opened from the closed position to the first position, and controlling, based on the identified rotational speed of the motor being faster than a threshold speed, the motor to open the door to a second position by rotating at a third speed which is slower than the second speed.

The identifying a rotational speed of the motor may include identifying a rotational speed of the motor based on a first time point at which an opening of the door is sensed by the first sensor and a second time point at which a position of the door is sensed as in the first position by the second sensor.

The refrigerator may further include a proximity sensor, and the controlling method may further include stopping the motor based on sensing an object present within a pre-set distance from the door by the proximity sensor while the motor is in rotation.

The controlling method may further include controlling the motor to rotate at a fourth speed to close the door based on a pre-set time passing after the door is opened to the second position, and controlling, based on a position of the door being sensed as in the first position by the second sensor, the motor to cause the door to be fully closed by rotating at a fifth speed which is faster than the fourth speed.

The technical solution of the disclosure is not limited to the above-described means of solution, and the means of solution will be clearly understood by those of ordinary skill in the related art from the detailed description and the accompanied drawings, unless otherwise specified.

According to one or more embodiments as described above, the door may be opened at variable speeds by appropriately controlling the rotational speed of the motor of the refrigerator door opening device. Accordingly, user safety, convenience, and satisfaction may be improved.

The effect which may be obtained or predicted by the embodiments of the disclosure other than what has been described above, will be directly disclosed or implied in the detailed description on the embodiments of the disclosure. For example, the various effects which may be predicted according to an embodiment of the disclosure will be described in the detailed description below.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a table in which a calibration rpm of a motor according an opening time of a door is disclosed according to an embodiment of the disclosure;

The same reference numerals are used to represent the same elements throughout the drawings.

DETAILED DESCRIPTION

Figure 1:
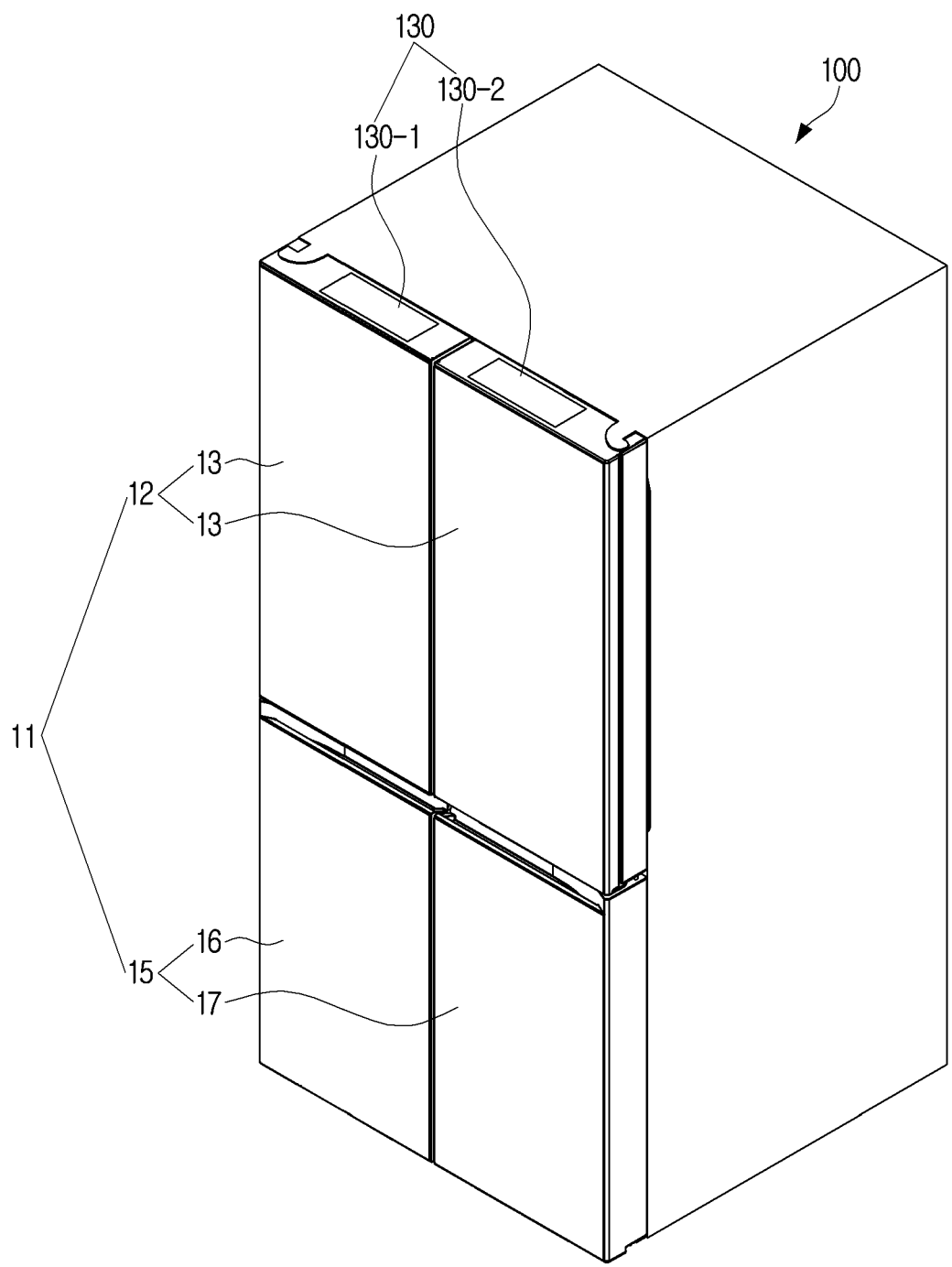
FIG. 1 is a perspective view of a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in certain cases, there may be terms arbitrarily selected, and this case, the meaning of the term will be disclosed in greater detail in the corresponding description. Accordingly, the terms used herein are not to be understood simply as its designation but based on the meaning of the term and the overall context of the disclosure.

Various modifications may be made to the embodiments of the disclosure, and there may be various types of embodiments. Accordingly, specific embodiments will be illustrated in drawings, and the embodiments will be described in detail in the detailed description. However, it should be noted that the one or more embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed description of related known technologies may unnecessarily confuse the gist of the disclosure, the detailed description will be omitted.

Terms such as "first," and "second" may be used in describing the various elements, but the elements are not to be limited by the terms. The terms may be used only to distinguish one element from another.

A singular expression includes a plural expression, unless otherwise specified. It is to be understood that the terms such as "comprise" or "include" are used herein to designate a presence of a characteristic, number, operation, element, component, or a combination thereof, and not to preclude a presence or a possibility of adding one or more of other features, numbers, operations, elements, components or a combination thereof.

Embodiments of the disclosure will be described in detail below with reference to the accompanying drawings to aid in the understanding of those of ordinary skill in the art. However, the disclosure may be realized in various different forms and it should be noted that the disclosure is not limited to the embodiments described herein. Further, in the drawings, parts not relevant to the description may be omitted, and like reference numerals may be used to indicate like elements throughout the detailed description.

FIG. 1 is a perspective view of a refrigerator according to an embodiment of the disclosure.

Referring to FIG. 1, a refrigerator 100 may include a plurality of doors 11 and a door opening device 130.

The door 11 may include a refrigerator compartment door 12 and a freezer compartment door 15. The refrigerator compartment door 12 may include a first refrigerator compartment door 13 and a second refrigerator compartment door 14. Further, the freezer compartment door 15 may include a first freezer compartment door 16 and a second freezer compartment door 17. Meanwhile, a T-shaped refrigerator including 4 doors has been described as an example in the disclosure, but an idea for opening the door 11 which will be described below may be applied to various refrigerators without limitation to the refrigerator type.

The door opening device 130 may be a configuration for opening the door 11, and may be disposed at a door requiring opening. In an example, as illustrated in FIG. 1, the door opening device 130 may be provided to multiple refrigerator compartment doors 12 respectively to open the respective refrigerator compartment doors 12. That is, a first door opening device 130-1 may be disposed at an upper end of the first refrigerator compartment door 13, and a second door opening device 130-2 may be disposed at an upper end of the second refrigerator compartment door 14. However, the embodiment is not limited thereto, and based on one refrigerator compartment door 12 including multiple doors, the door opening device 130 may be provided at one or all of the multiple doors. Alternatively, the door opening device 130 may be provided to the freezer compartment door 15 to open the freezer compartment door 15.

Figure 2A:
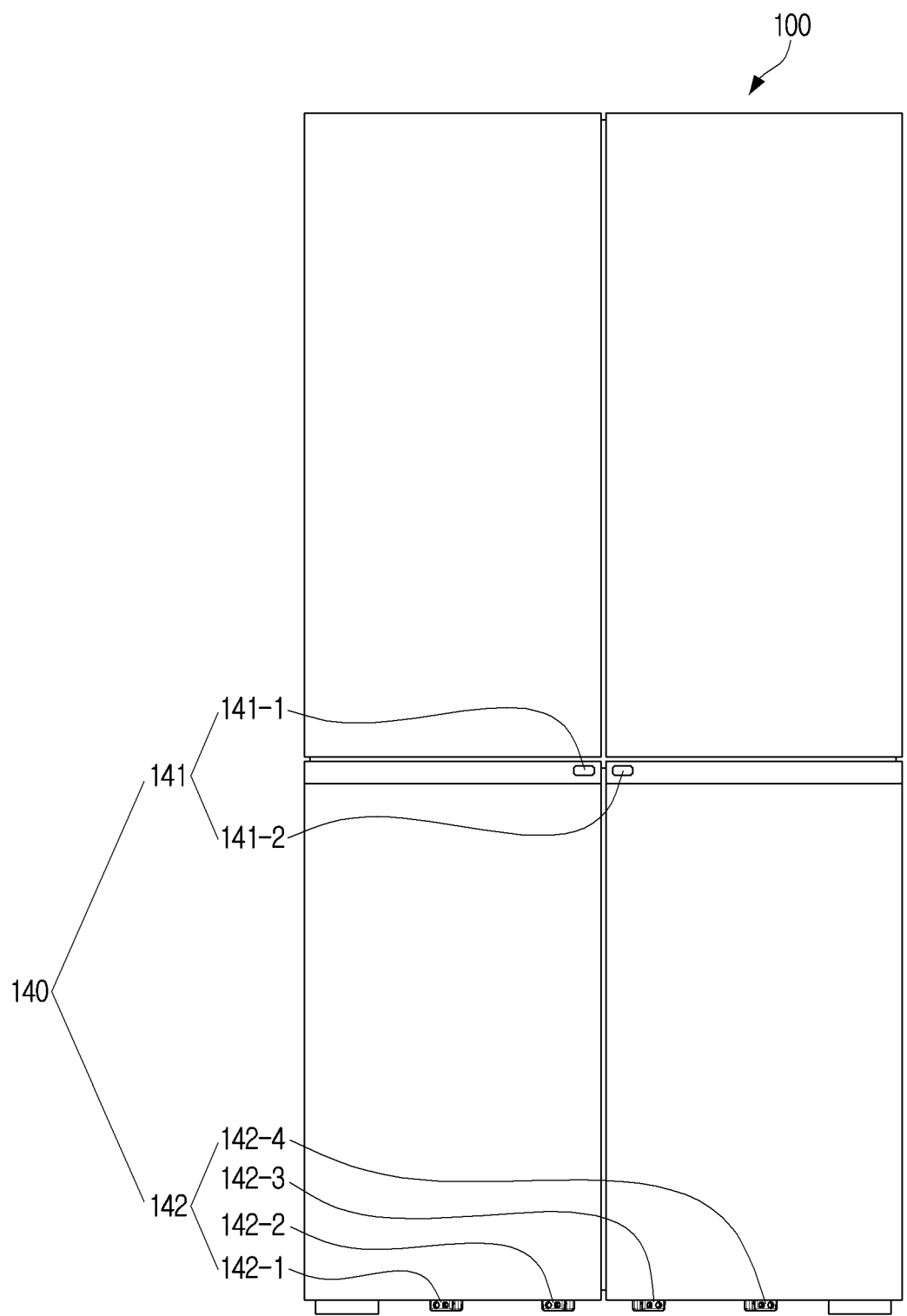
FIG. 2A is a front view of a refrigerator according to an embodiment of the disclosure.

FIG. 2A is a front view of a refrigerator according to an embodiment of the disclosure.

Referring to FIG. 2A, the refrigerator 100 may include an object sensing part 140.

The object sensing part 140 may be a configuration for sensing an object (or, user) present within a pre-set range from the refrigerator 100, and may include a plurality of proximity sensors 141 and 142. A first sensor 141 may include a first-1 sensor 141-1 and a first-2 sensor 141-2, and a second sensor 142 may include a second-1 sensor 142-1, a second-2 sensor 142-2, a second-3 sensor 142-3, and a second-4 sensor 142-4. For example, the object sensing part 140 may be implemented as an infrared rays (IR) sensor, an ultrasonic sensor, or a camera.

The first sensor 141 may be disposed at the upper end of the freezer compartment door 15. However, this is merely one embodiment, and the first sensor 141 may be disposed on a frame of the refrigerator 100 which is positioned between the refrigerator compartment door 12 and the freezer compartment door 15. The second sensor 142 may be disposed at a lower end of the freezer compartment door 15. Specifically, the second sensor 142 may be attached to a bottom surface of the freezer compartment door 15. Accordingly, the first sensor 141 and the second sensor 142 may easily sense an object in the surroundings of the refrigerator 100.

Figure 2B:
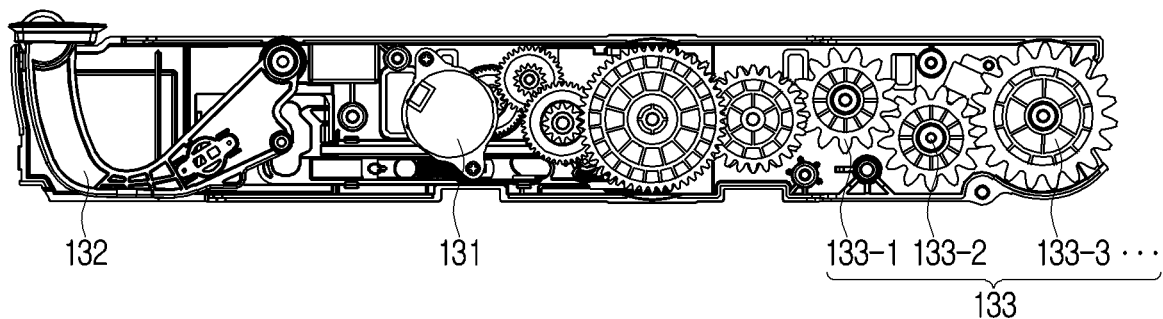
FIG. 2B is a view illustrating a door opening device according to an embodiment of the disclosure.

FIG. 2B is a view illustrating a door opening device according to an embodiment of the disclosure. Specifically, the door opening device 130 of FIG. 2B may be the second door opening device 130-2 of FIG. 1.

Referring to FIG. 2B, the door opening device 130 may include a motor 131, a lever 132, multiple gears 133, and a clutch. The motor 131 may be configured to provide rotational force (i.e. torque) to the gear 133. The gear 133 may be configured to transfer the rotational force provided from the motor 131 to the lever 132 via multiple gears 133-1, 133-2 and 133-3. The lever 132 may be configured to open the door 11 by applying outside force to a body of the refrigerator 100 based on the rotational force transferred through the gear 133.

Figure 2C:
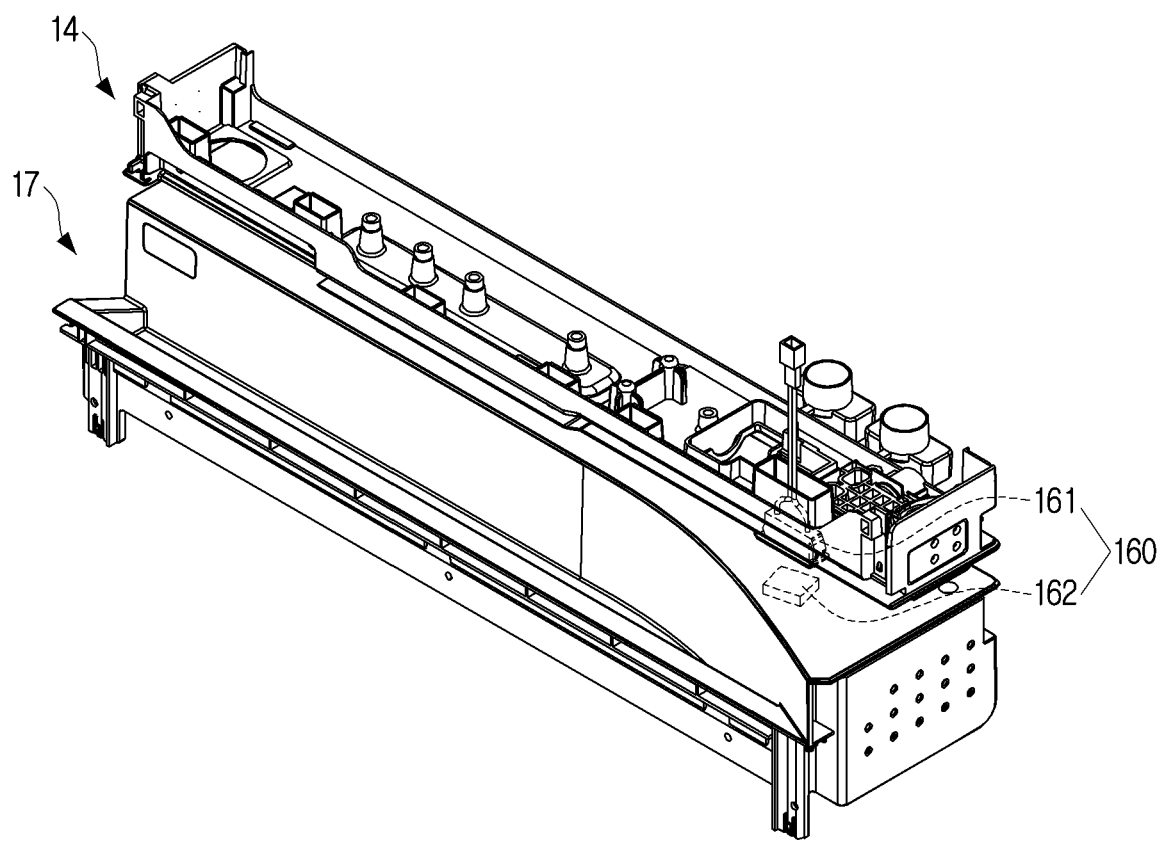
FIG. 2C is a perspective view of a door position sensing part according to an embodiment of the disclosure.

FIG. 2C is a perspective view of a door position sensing part according to an embodiment of the disclosure.

Figure 2D:
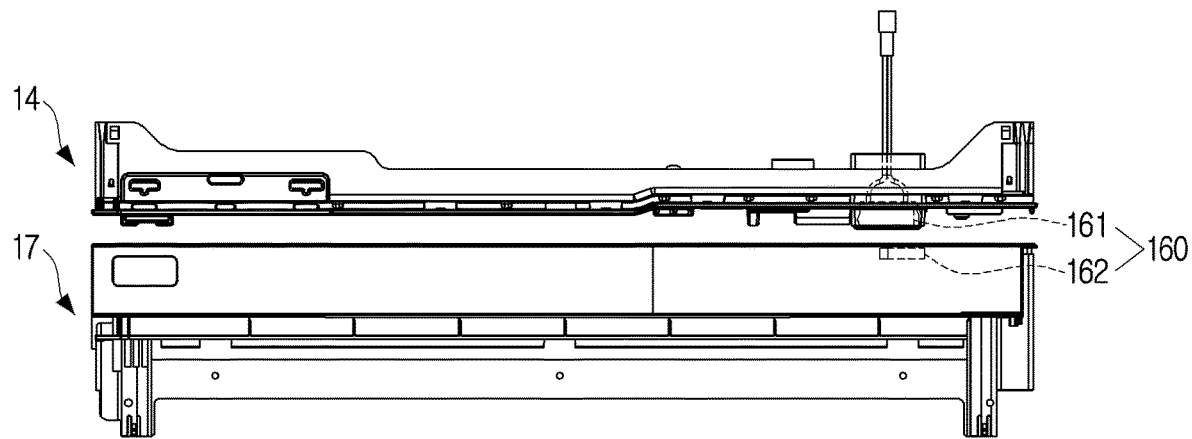
FIG. 2D is a view illustrating a representation of a door position sensing part when viewing a refrigerator from a front according to an embodiment of the disclosure.

FIG. 2D is a view illustrating a representation of a door position sensing part when viewing the refrigerator from a front according to an embodiment of the disclosure.

Referring to FIGS. 2C and 2D, a door position sensing part 160 may be a configuration for sensing a position (or, rotation angle) of the door 11, and may include at least one sensor. For example, the door position sensing part 160 may include a magnet 162 and a reed switch 161 configured to be turned-on and turned off by the magnet 162. Alternatively, the door position sensing part 160 may be comprised with the magnet 162 and a hall sensor. The hall sensor may be disposed at a position corresponding to the position at which the reed switch 161 is installed.

The door position sensing part 160 may be disposed at a position convenient for sensing the position of the door 11. For example, as illustrated in FIG. 2D, the reed switch 161 may be disposed at the lower end of the second refrigerator compartment door 14, and the magnet 162 may be disposed at the upper end of the second freezer compartment door 17. However, this is merely an embodiment, and the embodiment may be realized in the form of the reed switch 161 being disposed at the upper end of the second freezer compartment door 17, and the magnet 162 being disposed at the lower end of the second refrigerator compartment door 14. In the above, the door position sensing part 160 has been described as being disposed at the second refrigerator compartment door 14 and the second freezer compartment door 17 for convenience of description, but the door position sensing part 160 may be disposed at the first refrigerator compartment door 13 and the first freezer compartment door 16. In addition, the plurality of door position sensing parts 160 may be disposed at the first refrigerator compartment door 13, the first freezer compartment door 16, the second refrigerator compartment door 14, and the second freezer compartment door 17, respectively.

Figure 3:
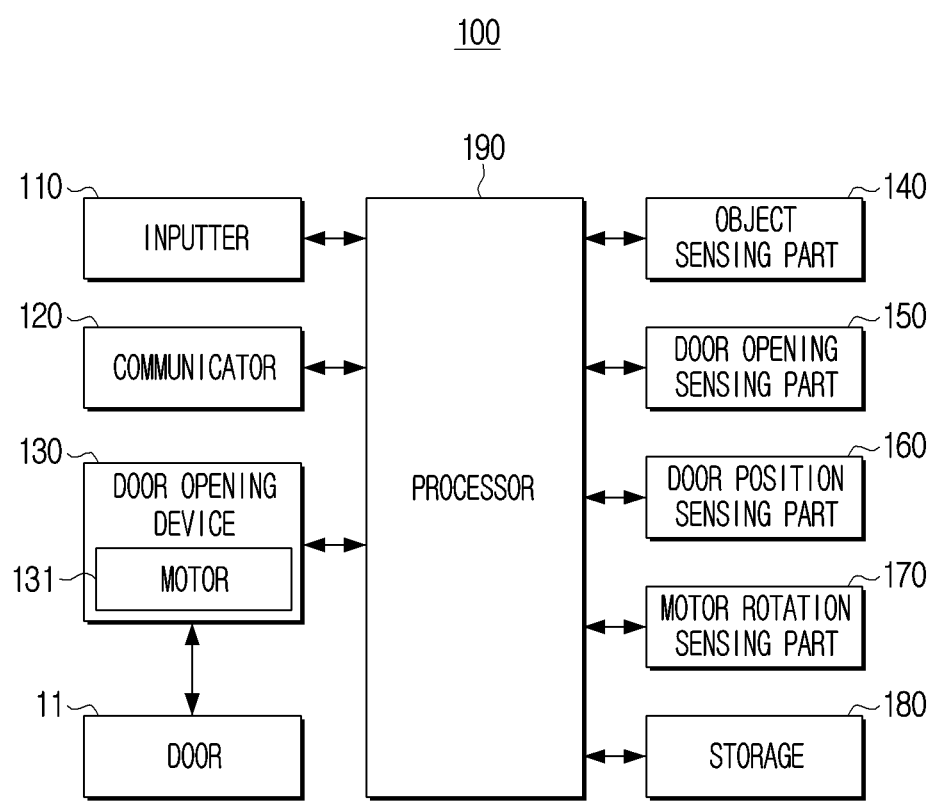
FIG. 3 is a block diagram illustrating a configuration of a refrigerator according to an embodiment of the disclosure.

FIG. 3 is a block diagram illustrating a configuration of a refrigerator according to an embodiment of the disclosure.

Referring to FIG. 3, the refrigerator 100 may include a door 11, an inputter 110, a communicator 120, a door opening device 130, an object sensing part 140, a door opening sensing part 150, a door position sensing part 160, a motor rotation sensing part 170, a storage 180 and a processor 190. The respective configurations of the refrigerator 100 will be described below.

The inputter 110 may be a configuration for obtaining a user command for opening the door 11. For example, the inputter 110 may be implemented as a microphone configured to obtain a voice command of the user, a switch configured to be turned-on by contact of the user, a touch screen configured to obtain a touch input of the user, or a sensor configured to sense a gesture of the user, but is not limited thereto.

The communicator 120 may include at least one circuitry and may be configured to perform communication with external devices of various types. The communicator 120 may include a wireless communication module. For example, the communicator 120 may include at least one from among a Wi-Fi module, a Bluetooth communication module, a cellular communication module, a 4th generation (4G) long term evolution (LTE) communication module, and a 5th generation (5G) communication module. The communicator 120 may be configured to receive the user command for opening the door 11, which is transmitted from a user terminal device. In addition, the communicator 120 may be configured to transmit, based on obtaining the user command from a microphone, the obtained voice command to an external server.

The door opening device 130 may be a configuration for opening the door 11 as described above in FIG. 2D, and may include the motor 131 for providing rotational force. In addition, the door opening device 130 may include a power supply part (e.g., battery) for providing power of the motor 131.

The object sensing part 140 may be a configuration for sensing an object (or, user) present within a pre-set distance from the refrigerator 100 as described above in FIG. 2A. The pre-set distance may be a distance set to prevent collision between the door 11 and the object, and may be, for example, 30 cm. The processor 190 may be configured to control the motor 131 based on a sensing result of the object sensing part 140.

The door opening sensing part 150 may be a configuration for sensing an opening of the door 11, and may include at least one sensor. The door opening sensing part 150 may include a pressing part, and the pressing part may be configured to sense the opening and closing of the door based on being pressed by the door. For example, the door opening sensing part 150 may include a door switch. The door opening sensing part 150 may be disposed at various positions. In an example, the door opening sensing part 150 may be disposed on a plate of the refrigerator 100. The plate may refer to a panel surrounding the outer side of the refrigerator 10 body.

The door position sensing part 160 may be a configuration for sensing a position (or, rotation angle) of the door 11. The door position sensing part 160 may be configured to sense whether the door 11 is positioned at a pre-set position. For example, the pre-set position may refer to a position which is opened by 30 degrees from the position in which the door 11 is closed. The processor 190 may be configured to control the rotational speed of the motor 131 based on the sensing result.

The motor rotation sensing part 170 may be a configuration for sensing a rotation of the motor 131. For example, the motor rotation sensing part 170 may be the hall sensor. The motor rotation sensing part 170 may be configured to output a pulse in the rotating process of the motor 131. The processor 190 may be configured to control the rotational speed of the motor 131 based on a pulse cycle output from the motor rotation sensing part 170.

The storage 180 may be configured to store an instruction or data related to at least one other element of the refrigerator 100. The storage 180 may include a non-volatile memory and a volatile memory, and may be implemented as, for example, a flash-memory, a hard disk drive (HDD), a solid state drive (SSD), or the like. The storage 180 may be accessed by the processor 190 and reading/writing/modifying/deleting/updating of data by the processor 190 may be performed. The storage 180 may be configured to store a calibration rpm of the motor 131 according to an opening time of the door 11. Here, the calibration rpm may refer to a rotational speed of the motor 131 when the door 11 is positioned at a specific area.

The processor 190 may be configured to control the overall operation of the refrigerator 100. Specifically, the processor 190 may be configured to control the rotational speed of the motor 131.

The processor 190 may be configured to control the motor 131 to rotate at a first speed based on the user command for opening the door 11 being obtained. Then, based on sensing the opening of the door 11 by the door opening sensing part 150, the processor 190 may be configured to control the motor 131 to rotate by reducing speed in stages to a second speed, which is slower than the first speed. In addition, based on the position of the door 11 being sensed in a first position by the door position sensing part 160, the processor 190 may be configured to control the motor 131 to open the door 11 until a second position by rotating at the second speed. The first position may refer to a position which is opened by rotating by 30 degrees from the position in which the door 11 is closed, and the second position may refer to a position which is opened by rotating by 90 degrees from the position in which the door 11 is closed. That is, the processor 190 may be configured to control the motor 131 so as to open the door 11 at a relatively slow speed in an area in which likelihood of collision with the user is relatively high, and control the motor 131 so as to open the door 11 at a relatively fast speed in an area in which the likelihood of collision is relatively low. Accordingly, the likelihood of collision between the door 11 and the user is reduced, and user satisfaction may be improved.

The processor 190 may be configured to stop the motor 131 if a pulse is not output from the motor rotation sensing part 170 for a pre-set time. That is, the processor 190 may be configured to determine, based on the pulse not being output from the motor rotation sensing part 170 despite controlling the motor 131 to rotate, the door 11 as being in an unopenable state by an external load, and stop the motor 131. Accordingly, damage by an overload of the motor 131 may be prevented.

The processor 190 may be configured to stop the motor 131 with different sensitivities according to the position of the door 11. For example, the processor 190 may be configured to stop, based on the door 11 being positioned between the closed position and the first position, the motor 131 if a pulse is not output from the motor rotation sensing part 170 for a first time. Alternatively, when the door 11 is positioned between the first position and the second position, the processor 190 may be configured to stop the motor 131 if a pulse is not output from the motor rotation sensing part 170 for a second time, which is less than the first time. That is, the processor 190 may be configured to stop the motor 131 more sensitively when the door 11 is positioned between the first position and the second position than when the door 11 positioned between the closed position and the first position.

The processor 190 may be configured to identify the rotational speed of the motor 131 while the door 11 is being opened from the closed position until the first position. Specifically, the processor 190 may be configured to identify the rotational speed of the motor 131 based on a difference between a first time point in which the opening of the door 11 is sensed by the door opening sensing part 150 and a second time point in which the position of the door 11 is sensed as being in the first position by the door position sensing part 160. Based on the identified rotational speed of the motor being faster than a threshold speed, the processor 190 may be configured to control the motor 131 so as to open the door 11 until the second position by rotating at a third speed, which is slower than the second speed. Accordingly, the door 11 may be opened to a preset position.

In addition, the processor 190 may be configured to stop the motor 131 based on sensing an object present within a pre-set distance from the refrigerator 100 by the object sensing part 140 while the motor 131 is in rotation. For example, the processor 190 may be configured to stop the door 11 by stopping the motor 131 based on sensing an object present within 30 cm from the refrigerator 100 while the door 11 is being opened. Accordingly, a collision between the door 11 and the object may be prevented.

The processor 190 may be configured to control, based on a pre-set time passing after the door 11 is opened to the second position, the motor 131 so that the door 11 is closed. Accordingly, loss of power may be prevented based on the door 11 being opened for a long time. In addition, the processor 190 may be configured to control the motor 131 so as to rotate at a fourth speed when controlling the motor 131 so that the door 11 may be closed, and control the motor 131 so that the door 11 may be fully closed by rotating at a fifth speed, which is faster than the fourth speed, when the position of the door 11 is sensed to be at the first position by the door position sensing part 160.

In the above, the components of the refrigerator 100 have been described. The operations of the refrigerator 100 will be described in greater detail below.

Figure 4A:
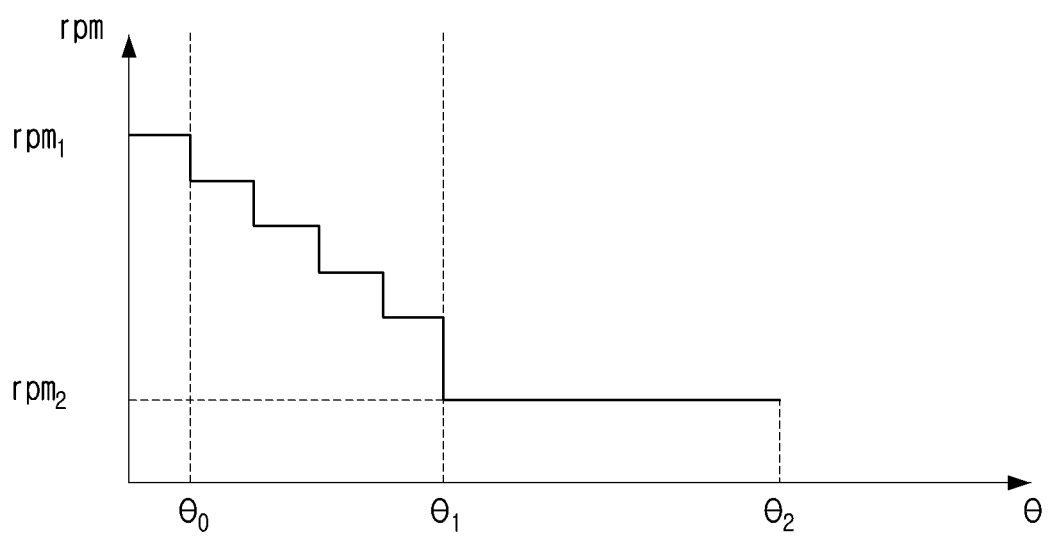
FIG. 4A is a graph illustrating a rotational speed of a motor according to an embodiment of the disclosure.

FIG. 4A is a graph illustrating a rotational speed of a motor according to an embodiment of the disclosure.

Figure 4B:
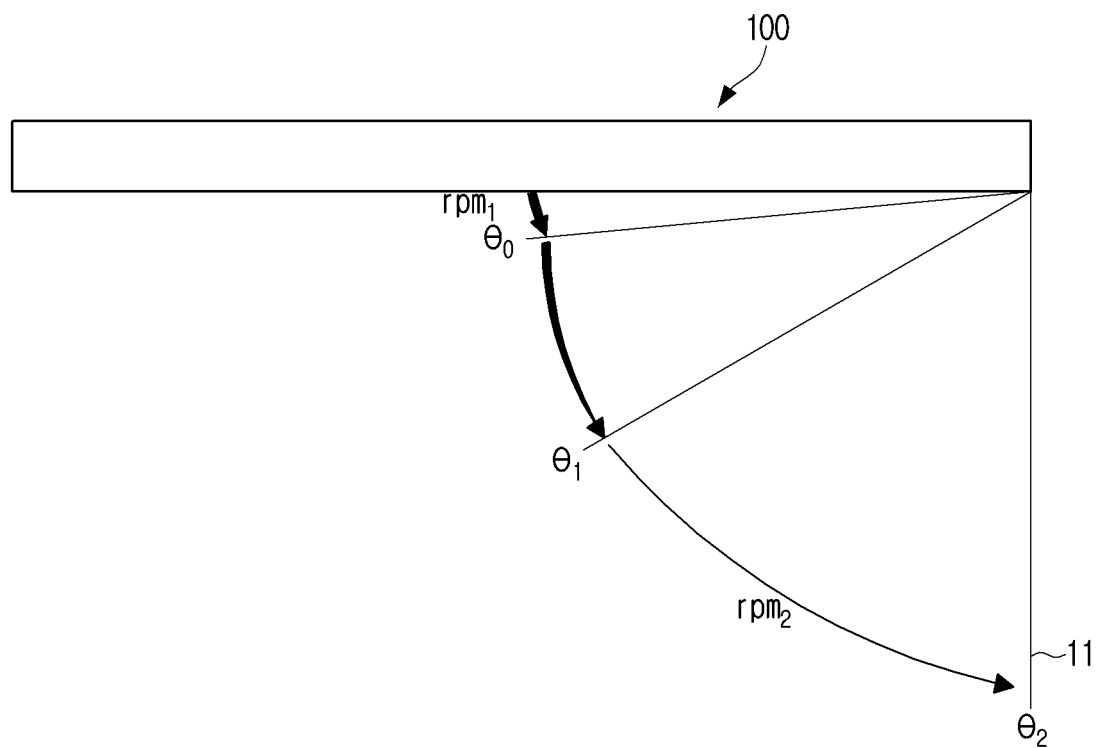
FIG. 4B is a diagram illustrating a representation of a door rotating according to an embodiment of the disclosure.

FIG. 4B is a diagram illustrating a representation of a door rotating according to an embodiment of the disclosure.

Referring to FIGS. 4A and 4B, the refrigerator 100 may be configured to rotate the motor 131 at the first speed $rpm_1$ based on the user command for opening the door 11 being obtained through the inputter 110 or the communicator 120. Then, the refrigerator 100 may be configured to reduce the rotational speed of the motor 131 when the opening of the door 11 is sensed (i.e., when the door 11 is rotated by a certain angle $\theta_0$ (e.g., 3 to 4 degrees) from the closed position) by the door opening sensing part 150. Specifically, the refrigerator 100 may be configured to control the motor 131 so as to rotate by reducing speed in stages to the second speed $rpm_2$, which is slower than the first speed $rpm_1$.

Based on the position of the door 11 being sensed in the first position 81 by the door position sensing part 160 as the door 11 rotates, the refrigerator 100 may be configured to control the motor 131 so as to rotate the door 11 while maintaining the second speed $rpm_2$ until the door 11 is opened to the second position $\theta_2$. The first position $\theta_1$ may be a position which is opened by 30 degrees from the position in which the door 11 is closed, and the second position $\theta_2$ may be a position which is opened by 90 degrees from the position in which the door 11 is closed. Accordingly, as illustrated in FIG. 5B, the door 11 may be opened at a slow speed in a segment between first position $\theta_1$ and the second position $\theta_2$ than a segment between the closed position and the first position $\theta_1$. Accordingly, a likelihood of collision between the door 11 and the user may be reduced.

The refrigerator 100 may be configured to activate a so-called lock function based on a pulse output from the motor rotation sensing part 170. Specifically, the refrigerator 100 may be configured to stop the motor 131 when a pulse is not output from the motor rotation sensing part 170 for a pre-set time. That is, the refrigerator 100 may be configured to determine, based on the motor 131 rotating at a speed slower than the threshold speed, that the door 11 is in an unopenable state by an external load, or the like, and stop the motor 131. The threshold speed may be determined based on a control signal for driving the motor 131. Accordingly, damage by an overload of the motor 131 may be prevented.

In addition, the refrigerator 100 may be configured to activate the lock function based on a standard different according to the position of the door 11. For example, when the door 11 is positioned between the closed position and the first position $\theta_1$, the refrigerator 100 may be configured to stop the motor 131 if a pulse is not output from the motor rotation sensing part 170 for the first time. Then, when the door 11 is positioned between the first position $\theta_1$ and the second position $\theta_2$, the refrigerator 100 may be configured to stop the motor 131 if a pulse is not output from the motor rotation sensing part 170 for the second time, which is less than the first time. That is, the refrigerator 100 may be configured to activate the lock function more sensitively when the door 11 is positioned between the first position $\theta_1$ and the second position $\theta_2$, which is an area with a relatively high likelihood of collision with the user than when the door 11 is positioned between the position in which the door 11 is closed and the first position $\theta_1$, which has a relatively low likelihood of collision with the user. Accordingly, the safety of the user may be improved.

The rotational speed of the motor 131 may be rotated differently from the pre-set value according to an external load or the weight of the objects loaded in the storage space provided in the door 11. For example, based on the weight of the door 11 being heavier than the pre-set weight, the rotational speed of the motor 131 may rotate slower than the pre-set speed. Accordingly, the door 11 may not be opened to a pre-set angle. The refrigerator 100 may be configured to control the rotational speed of the motor 131 based on the actual rotational speed of the motor 131 sensed by the motor rotation sensing part 170 so that the door 11 is opened to a uniform position even in this kind of situation.

Figure 5A:
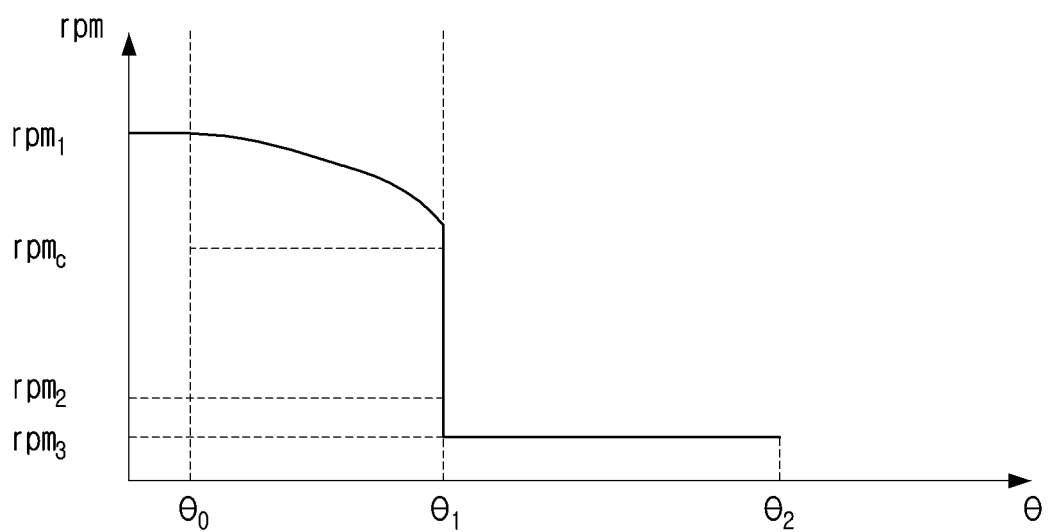
FIG. 5A is a graph illustrating a rotational speed of a motor according to an embodiment of the disclosure.

FIG. 5A is a graph illustrating a rotational speed of a motor according to an embodiment of the disclosure.

Referring to FIG. 5A, an average rotational speed of the motor 131 sensed through the motor rotation sensing part 170 when the door 11 is positioned between the closed position and the first position $\theta_1$ may be faster than the threshold speed $rpm_c$. The refrigerator 100 may be configured to control the motor 131 so as to rotate at the third speed $rpm_3$ which is slower than the second speed $rpm_2$ after the door 11 has arrived at the first position $\theta_1$. Accordingly, the door 11 may be opened to the second position $\theta_2$.

The refrigerator 100 may be configured to control the rotational speed of the motor 131 based on a time spent until the door 11 is opened to the pre-set position.

FIG. 5B is a table in which a calibration rpm of the motor according an opening time of the door is disclosed according to an embodiment of the disclosure.

Referring to FIG. 5B, the time t may refer to the time spent from the time point at which the opening of the door 11 started until the door 11 arriving at the pre-set position (e.g., first position $\theta_1$), and the calibration rpm may refer to the rotational speed of the motor 131 after the door 11 arrives at the pre-set position. For example, based on the time spent until the door 11 is opened to the pre-set position being 1100 ms, the refrigerator 100 may be configured to control the motor 131 so that the motor 131 rotates at 300 rpm after the door 11 arrived at the pre-set position.

The refrigerator 100 may be configured to rotate the motor 131 to close the door 11 when a close door 11 command is obtained from the user or when a specific condition is satisfied. The specific condition may include a user not being sensed within a pre-set range for a pre-set time by the object sensing part 140. The refrigerator 100 may be configured to rotate the motor 131 to a direction opposite to when opening the door 11. In addition, the refrigerator 100 may be configured to control the motor 131 so that the speed of the motor 131 may be variable even when the door 11 is being closed. The table as described above may be stored in the storage 180 in the form of a look-up table.

Figure 6:
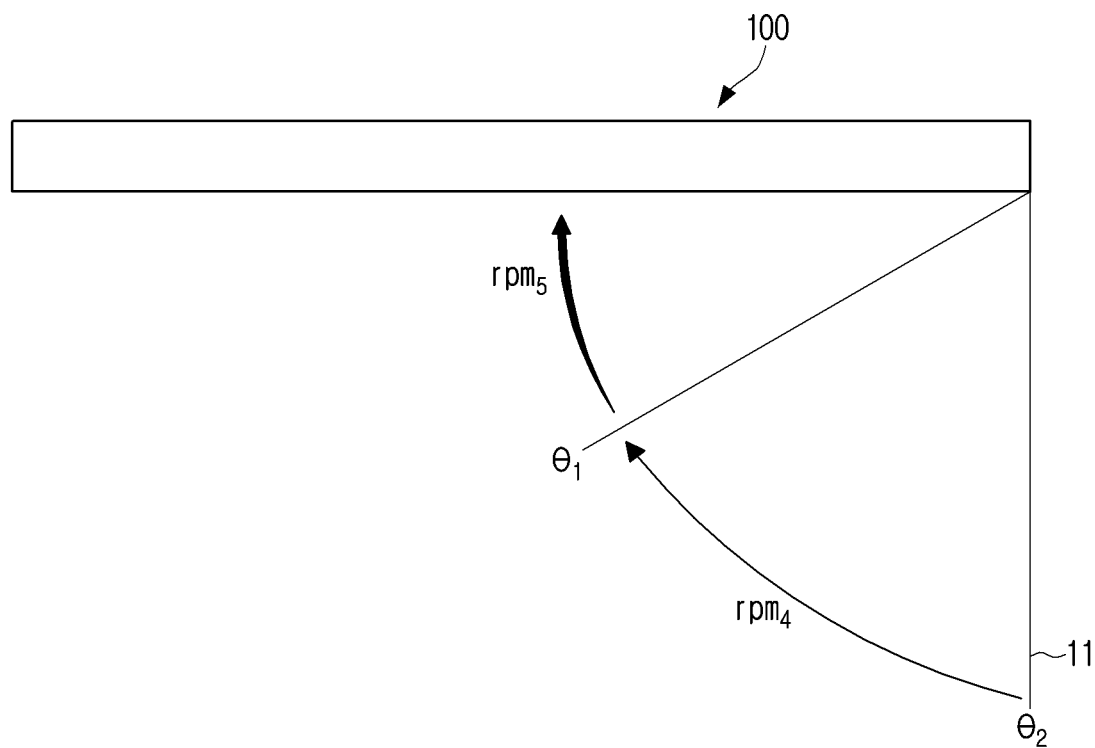
FIG. 6 is a diagram illustrating a representation of a door closing according to an embodiment of the disclosure.

FIG. 6 is a diagram illustrating a representation of the door closing according to an embodiment of the disclosure.

Referring to FIG. 6, the refrigerator 100 may be configured to rotate the motor 131 at the fourth speed $rpm_4$ when the door 11 is positioned between the first position $\theta_1$ and the second position $\theta_2$. Then, when the door 11 is closed to the first position $\theta_1$, the rotational speed of the motor 131 may be increased after the time point the door 11 arrives at the first position $\theta_1$. Accordingly, while the door 11 is moving from the first position $\theta_1$ to the closed position, the motor 131 may be configured to control the motor 131 so as to rotate at the fifth speed $rpm_5$, which is faster than the fourth speed $rpm_4$. Accordingly, the door 11 may be closed faster when positioned between the first position $\theta_1$ and the closed position than when positioned between the first position $\theta_1$ and the second position $\theta_2$.

The refrigerator 100 may be configured to activate the lock function based on a pulse output from the motor rotation sensing part 170 while the door 11 is being closed. In addition, the refrigerator 100 may be configured to stop the motor 131 based on sensing an object present within the pre-set distance from the door 11 by the object sensing part 140 while the motor 131 is in rotation.

Figure 7:
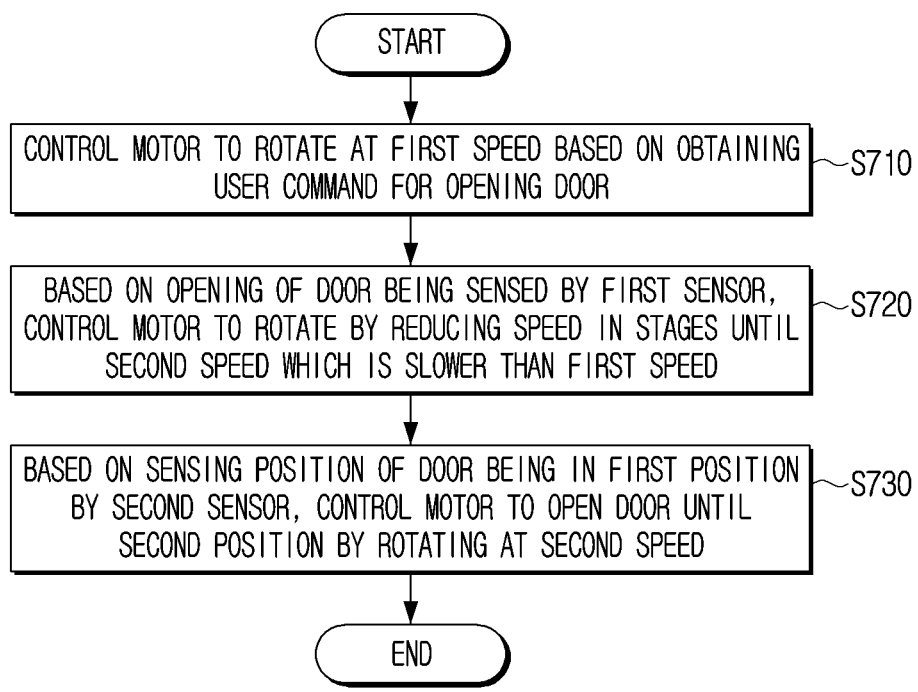
FIG. 7 is a flowchart illustrating a controlling method of a refrigerator according to an embodiment of the disclosure.

FIG. 7 is a flowchart illustrating a controlling method of the refrigerator according to an embodiment of the disclosure.

Referring to FIG. 7, the refrigerator 100 may be configured to control the motor 131 so as to rotate at the first speed when the user command for opening the door 11 is obtained at operation S710. Next, control the motor 131 so as to rotate by reducing speed in stages to the second speed, which is slower than the first speed, when the opening of the door is sensed by the first sensor 141 at operation S720. Then, control the motor so that the door may be opened to the second position by rotating at the second speed based on the position of the door being sensed in the first position by the second sensor 142 at operation S730. The respective operations will be described below.

The refrigerator 100 may be configured to control the motor 131 to rotate at the first speed based on the user command for opening to door 11 being obtained at operation S710. The user command may include a voice command and a gesture command.

The refrigerator 100 may be configured to control the motor 131 to rotate by reducing speed in stages to the second speed, which is slower than the first speed, based on the opening of the door 11 being senesced by the first sensor 141 at operation S720. The refrigerator 100 may be configured to obtain the actual rotational speed of the motor 131 through the motor rotation sensing part 170. The refrigerator 100 may be configured to increase or decrease the rotational speed of the motor 131 based on the obtained rotational speed of the motor 131, or stop the motor 131. Because the detailed description thereof has been described above, it will be omitted.

The refrigerator 100 may be configured to control, based on the position of the door being sensed in the first position by the second sensor 142, the motor 131 so as to open the door 11 until the second position by rotating at the second speed at operation S730. The first position may be a position which is opened by 30 degrees from the position in which the door is closed, and the second position may be a position which is opened by 90 degrees from the position in which the door is closed. That is, the refrigerator 100 may be configured to control the motor 131 so as to open the door 11 at a relatively slow speed in an area in which likelihood of collision with the user is relatively high, and control the motor 131 so as to open the door 11 at a relatively fast speed in an area in which the likelihood of collision is relatively low.

The one or more embodiments described above may be implemented in a recordable medium which is readable by a computer or a device similar to the computer using a software, a hardware, or the combination of the software and the hardware. In some cases, embodiments described herein may be implemented by the processor itself. According to a software implementation, embodiments such as the procedures and functions described herein may be implemented with separate software modules. The respective software modules may be configured to perform one or more of the functions and operations described herein.

The computer instructions for performing processing operations according to the one or more embodiments described above may be stored in a non-transitory computer-readable medium. The computer instructions stored in this non-transitory computer-readable medium may cause a specific device to perform the processing operations according to the above-described one or more embodiments when executed by the processor.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

The machine-readable storage medium may be provided in the form of a non-transitory storage medium. Herein, 'non-transitory' merely means a machine which is tangible and does not include a signal (e.g., electromagnetic waves), and the term does not differentiate data being semi-permanently stored and data temporarily being stored in the storage medium. For example, the 'non-transitory storage medium' may include a buffer in which data is temporarily stored.

According to an embodiment, a method according to one or more embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™) or directly between two user devices (e.g., smartphones). In the case of online distribution, at least a portion of the computer program product (e.g., downloadable app) may be at least stored temporarily in a storage medium such as a server of a manufacturer, a server of an application store, or a memory of a relay server, or temporarily generated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator, comprising:
  a body comprising a door;
  a door opening device comprising a motor, the door opening device configured to open the door through a rotation of the motor;
  a first sensor configured to sense an opening of the door;
  a second sensor configured to sense a position of the door; and
  a processor,
  wherein the processor is configured to:
    control, based on a user command for the opening of the door being obtained, the motor to rotate at a first speed,
    control, based on the opening of the door being sensed by the first sensor, the motor to rotate by reducing a speed of the motor in a series of stages, each stage slower than a previous stage, until a second speed which is slower than the first speed is reached,
    control, based on the position of the door being sensed in a first position by the second sensor, the motor to open the door to a second position by rotating at the second speed,
    identify whether a rotational speed of the motor is faster than a threshold speed, wherein the rotational speed of the motor is a speed of the motor while the door is being opened from a closed position to the first position, and
    control, based on the identified rotational speed of the motor being faster than the threshold speed, the motor to open the door to the second position by rotating at a third speed which is slower than the second speed.

2. The refrigerator of claim 1, further comprising:
  a motor rotation sensing part configured to sense the rotation of the motor,
  wherein the motor rotation sensing part is configured to output a pulse in a rotation process of the motor, and
  wherein the processor is further configured to stop the motor based on the pulse not being output from the motor rotation sensing part for a pre-set time.

3. The refrigerator of claim 2, wherein the processor is further configured to:
  stop the motor based on the pulse not being output from the motor rotation sensing part for a first time, when the door is positioned between a closed position and the first position; and
  stop the motor based on the pulse not being output from the motor rotation sensing part for a second time which is less than the first time, when the door is positioned between the first position and the second position.

4. The refrigerator of claim 1, wherein the processor is further configured to identify a rotational speed of the motor based on a difference between a first time point at which the opening of the door is sensed by the first sensor and a second time point at which the position of the door is sensed as in the first position by the second sensor.

5. The refrigerator of claim 1,
  wherein the door comprises a first door provided in a refrigerator compartment and a second door provide in a freezer compartment positioned at a lower part of the refrigerator compartment,
  wherein the door opening device is provided at an upper end of the first door, and
  wherein the second sensor is provided at a lower end of the first door.

6. The refrigerator of claim 1, further comprising:
  a proximity sensor,
  wherein the processor is configured to stop the motor based on sensing an object present within a pre-set distance from the door by the proximity sensor while the motor is in rotation.

7. The refrigerator of claim 1, wherein the processor is further configured to:
  control, based on a pre-set time passing after the door is opened to the second position, the motor so as to rotate at a fourth speed to close the door; and
  control, based on the position of the door being sensed in the first position by the second sensor, the motor to cause the door to be fully closed by rotating at a fifth speed which is faster than the fourth speed.

8. The refrigerator of claim 1,
  wherein the first position is a position opened by 30 degrees from the position in which the door is closed, and
  wherein the second position is a position opened by 90 degrees from the position in which the door is closed.

* * * * *